March 9, 1965 I. MAVROVIC 3,172,911
UREA SYNTHESIS PROCESS
Filed June 16, 1961
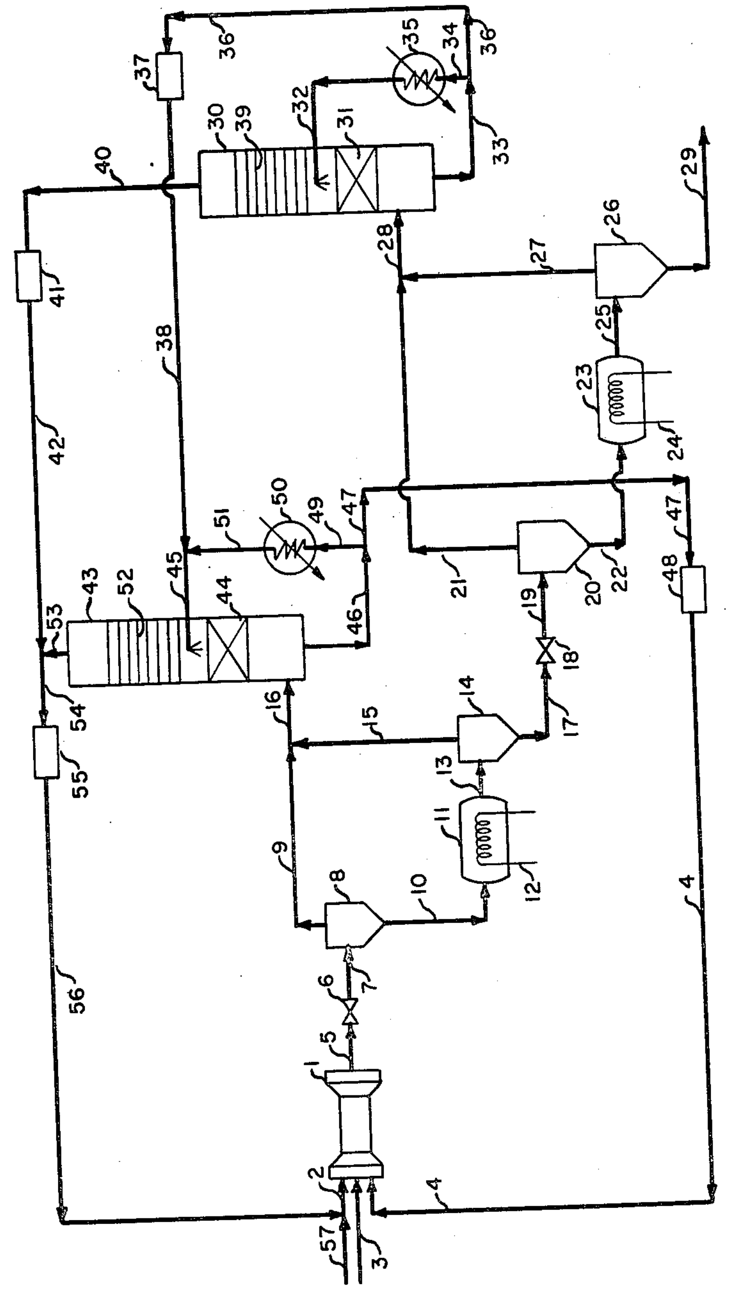
IVO MAVROVIC
*INVENTOR.*
BY J. T. Chaboty
AGENT 3,172,911
Patented Mar. 9, 1965

3,172,911

UREA SYNTHESIS PROCESS

Ivo Mavrovic, New York, N.Y., assignor to Chemical Construction Corporation, New York, N.Y., a corporation of Delaware Filed June 16, 1961, Ser. No. 117,631
5 Claims. (Cl. 260—555)

This invention relates to the synthesis of urea from ammonia and carbon dioxide. A process modification has been developed, whereby unconverted reactants may be recycled to the synthesis step while avoiding the recycle of excess water.

The synthesis of urea is accomplished by the reaction of ammonia and carbon dioxide at elevated pressure. Under synthesis conditions, these reactants immediately combine to form ammonium carbamate. This intermediate compound then splits off one molecule of water to yield urea. However, the dehydration reaction is slow and does not go to completion in commercial practice. Thus, the process stream derived from the high pressure synthesis stage contains urea, water, ammonium carbamate and excess ammonia. In current practice, this process stream is heated at reduced pressure in one or two stages in order to decompose the ammonium carbamate and produce an off-gas stream containing ammonia, carbon dioxide and water vapor. The residual aqueous urea solution may then be processed in any suitable manner to yield product urea. The off-gas may be utilized for the production of other fertilizers such as ammonium nitrate, however it is usually more desirable to recycle this off-gas to the urea synthesis process. The recycle may be accomplished in several ways, such as by partial condensation of the off-gas to form an aqueous ammonium carbamate solution while maintaining a residual off-gas of ammonia free of carbon dioxide. One process of this nature is described in co-pending U.S. patent application No. 5,379, filed January 29, 1960.

In all such recycle procedures, one basic problem is provision and maintenance of an economical water balance on the system. Thus, it is desirable to regulate the system so that a minimum proportion of water is recirculated through the system in the recycled aqueous ammonium carbamate solution. There are two main reasons why water recycle must be minimized. First, a high proportion of water in the synthesis system tends to lower the percent conversion of ammonium carbamate to urea, since this conversion is a reversible equilibrium-type dehydration reaction in which water is one of the reaction products. Secondly, water recycle reduces the net volume of the synthesis vessel which is available for the main urea synthesis reactions, and thus decreases the throughput rate for a given reactor volume. It should be understood that a definite minimum proportion of water must always be present in order to dissolve the recycling ammonium carbamate and form a pumpable liquid solution at conventional pressures and temperatures.

The problem of water buildup in the recycle system is one which becomes quite significant when a considerable excess of ammonia above the stoichiometric 2:1 ratio is employed. Thus, it is customary to operate with an overall ammonia:carbon dioxide molar feed ratio between 2.5:1 to 6:1. The reason for this is that the presence of excess free ammonia, above that amount which combines to form ammonium carbamate, tends to shift the dehydration reaction and increase percent conversion to urea. In some instances of complete recycle systems having feed ratios of 4:1 to 6:1, it has been found that water buildup tended to preclude the possibility of continuous operation. In all cases of molar ratios above 2.5:1 the problem of water buildup in the recycle system is encountered.

In the present invention, it has been found that water buildup in the off-gas and subsequently in the recycle aqueous ammonium carbamate solution may be controlled or avoided by an alteration of the carbamate decomposition procedure. Instead of pressure reduction combined with heating of the process stream to drive off a single off-gas at a particular pressure level, the pressure of the process stream is reduced in a flash reduction stage under substantially adiabatic conditions. The results in spontaneous decomposition of ammonium carbamate and evolution of considerable off-gas at a relatively lower temperature level. The resulting off-gas, which is quite low in water content, is then separated from the residual liquid process stream. The process stream is thereafter heated at the same pressure level, to promote further carbamate decomposition and generation of additional off-gas. This off-gas is also separated from the main process stream, and the two off-gas streams are combined to provide a total combined off-gas stream at the particular pressure level. This combined off-gas stream has a significantly lower water content than an equivalent off-gas stream generated by simultaneous pressure reduction and heating. It will be evident that the procedure outlined supra is readily applicable to processes in which ammonium carbamate is decomposed in two or more stages at different pressure levels.

As indicated supra, the primary advantage of this procedure is that off-gas streams are produced which are suitable for recycle in that water content is controlled at the minimum level necessary for an operative process. Since excess recycle water is avoided, process conversion rates and throughput rates are at acceptably high levels for recycle urea synthesis processes. The process of the present invention is also highly advantageous in that the improved results are achieved by the use of simple and inexpensive equipment. Thus, the major piece of equipment which is required, as compared to prior processes, is an additional gas-liquid separator and associated piping at each pressure level or stage of carbamate decomposition.

It is an object of the present invention to produce urea by means of an improved recycle process.

Another object is to recycle the unconverted reactants of a urea synthesis process in a more efficient manner.

A further object is to regulate and minimize the water content of recycle streams in a urea synthesis process.

An additional object is to reduce the water content of the off-gas stream derived from the ammonium carbamate decomposition section of a urea synthesis process.

An object is to provide a recycle process for urea synthesis in which buildup of water in the recycle streams is prevented.

Still another object is to provide a continuous, complete recycle process for urea synthesis in which water balance is regulated and water recycle is maintained at a minimum level.

These and other objects and advantages of the process of the present invention will become evident from the description which follows. Referring to the figure, a preferred embodiment of the present invention is presented in that two stages of ammonium carbamate decomposition at successively lower pressure levels are shown, and also since complete recycle of all unconverted process reactants is indicated. Modifications of this procedure of varying scope will be obvious to those skilled in the art.

In the figure, a high pressure urea autoclave is shown as vessel 1. Feed streams of ammonia, carbon dioxide and recycled aqueous ammonium carbamate solution, designated as streams 2, 3 and 4 respectively, are passed into synthesis vessel 1 in which urea synthesis conditions are maintained, usually in the range of 2000 p.s.i.g. to 6000 p.s.i.g. pressure and 320° F. to 430° F. The resulting process stream containing synthetic urea is removed from vessel 1 via 5 and adiabatically flashed through expansion valve 6 to a lower pressure level, preferably between 200 p.s.i.g. to 400 p.s.i.g. As a result the process temperature of outlet stream 7 is reduced to a lower level, preferably in the range of 240° F. to 270° F. In addition, spontaneous decomposition of a portion of the ammonium carbamate takes place at the lower pressure level. Thus, stream 7 contains an off-gas component which is low in water vapor content due to the adiabatic pressure reduction with concomitant temperature decrease.

Stream 7 now passes into gas-liquid separator 8, which is any suitable apparatus such as a cyclonic cylindrical vessel provided with internal baffles or whirl vanes. The gas phase is thus separated from stream 7, and passes overhead from separator 8 via 9. The residual liquid phase also leaves vessel 8 via 10, and is now heated in heat exchanger 11 provided with heating means 12, in order to promote further decomposition of ammonium carbamate in the process stream. The resulting heated process stream now leaves vessel 11 via 13, and is typically at a temperature between about 270° F. to 310° F. Stream 13 is processed in vessel 14 to separate the generated gas phase from the residual liquid phase. Vessel 14 has the same function as vessel 8 described supra, and thus may be identical in design and configuration. However, in some cases it may be desirable to orient vessel 14 immediately at the discharge end of heat exchanger 11, in order to utilize the velocity head generated therein due to heating and gas evolution, to aid in immediately separating the gas phase from the residual liquid. In any case, an additional off-gas stream 15 is thus removed from the main process stream at the 200 p.s.i.g. to 400 p.s.i.g. pressure level, and is combined with stream 9 to form combined high pressure off-gas stream 16 at 200 p.s.i.g. to 400 p.s.i.g. pressure.

The residual liquid phase now leaves separator vessel 14 via 17, and passes through expansion valve 18 whereby further adiabatic pressure reduction takes place, to a downstream pressure level preferably between 5 p.s.i.g. to 50 p.s.i.g. The stream 19 is thus formed with an integral gas phase due to spontaneous decomposition of ammonium carbamate, which results from the reduction in pressure. In addition, the temperature of the process stream 19 is at a lower level, typically in the range of 155° F. to 200° F. Thus, the overall effect of pressure reduction through expansion valve 18 is quite parallel to the results described supra when stream 5 passes through expansion valve 6.

Stream 19 now passes into gas-liquid separator 20, which has a function and mode of operation similar to vessel 8 described supra. The gas phase, of comparatively low water vapor content, is removed from vessel 20 via 21. The residual liquid phase also leaves vessel 20, via 22, and is now heated in heat exchanger 23 provided with heating means 24, in order to promote final decomposition of ammonium carbamate in the process stream. The resulting heated process stream now leaves vessel 23 via 25, and is typically at a temperature between about 200° F. to 240° F. Stream 25 is processed in vessel 26 to separate the generated gas phase from the residual liquid phase. Vessel 26 has the same function as vessel 14 described supra, and thus these two units may be identical in design and configuration. An additional and final off-gas stream component 27 is thus removed from the main process stream at the preferable 5 p.s.i.g. to 50 p.s.i.g. pressure level, and is combined with stream 21 to form combined low pressure off-gas stream 28 at 5 p.s.i.g. to 50 p.s.i.g. pressure.

The residual liquid phase is withdrawn from vessel 26 via 29. Stream 29, consisting of product aqueous urea solution containing only minor proportions of free ammonia and carbon dioxide, is now passed to urea finishing operations such as degassing, followed by prilling or crystallization, not shown. The resulting solid product urea is then shipped to market. In some cases stream 29 may be directly marketed and utilized as such, especially for fertilizer usages.

Low pressure off-gas stream 28, containing ammonia, carbon dioxide and water vapor at a total pressure in the range of 5 p.s.i.g. to 50 p.s.i.g., is now processed to partially separate the excess ammonia, and produce recycle streams of liquid aqueous ammonium carbamate solution and gaseous ammonia free of carbon dioxide. Thus, stream 28 is passed into condenser-stripper unit 30 below the packed section 31. The function, mode of operation and specific details of unit 30 are fully described in U.S. patent application No. 5,379, cited supra. Therefore, the operation of unit 30 will only be briefly outlined.

The gas stream 28 rises through the packed section 31 inside unit 30, and is scrubbed by cool recirculating solution 32, which consists of an aqueous ammonia-ammonium carbamate solution. This scrubbing causes a portion of gas stream 28 to condense into the liquid phase, as aqueous ammonium carbamate. The resulting scrub liquor stream 33, now warmed and containing additional ammonium carbamate solution, is partially recycled via 34, thru cooler 35 and back via 32 for further gas scrubbing. The balance of stream 33 is recycled via 36, either directly to urea synthesis or preferably stream 36 is compressed in pump 37 to the 200 p.s.i.g. to 400 p.s.i.g. range and recycled via 38 to join the high pressure condenser stripper section.

Returning to condenser-stripper unit 30, the residual rising gas stream above packed section 31, which is now considerably lower in concentration of carbon dioxide, is further cooled and refluxed in gas reflux section 39. Section 39 is provided with bubble cap trays for final ammonia gas purification by condensation of carbon dioxide as ammonium carbamate. One or more of the trays 39 may be provided with refrigeration, not shown. This refrigeration may be obtained by flashing a small amount of liquid ammonia onto the uppermost tray or trays. The residual rising gas stream at the top of unit 30, now consisting of ammonia free of carbon dioxide, is removed via 40 and recycled to urea synthesis. Stream 40 is preferably compressed in pump 41 to the high pressure recycle range of 200 p.s.i.g. to 400 p.s.i.g., and passed via 42 to join the high pressure recycle ammonia.

The high pressure off-gas stream 16 is also processed so as to produce recycle streams of aqueous ammonium carbamate solution and ammonia free of carbon dioxide. Thus, stream 16 is passed into condenser-stripper unit 43, which is similar in operation and function to unit 30 described supra. Unit 43 is provided with a lower packed section or sections 44, aqueous scrub solution is admitted via 45 to cool and condense ammonium carbamate solution from stream 16 in packed section 44, and a warmed scrub solution is removed from the bottom of unit 43 via 46. Stream 46, consisting of concentrated aqueous ammonium carbamate solution together with an equilibrium content of free ammonia, is now divided. A portion of stream 46 passes via 47 to recycle pump 48, in which the aqueous ammonia carbamate solution is pressurized to urea synthesis pressure, and discharged for recycle via 4 to urea synthesis. The balance of stream 46 passes via 49 through cooler 50, and is discharged via 51 and combined with stream 38 to provide recirculating scrub solution 45.

The rising gas stream inside unit 43 now passes through reflux section 52, where gas reflux and further cooling takes place, which results in condensing of ammonium carbamate to remove residual carbon dioxide from the gas stream. The final residual gas stream of ammonia free of carbon dioxide is removed overhead from unit 43 via 53, and combined with ammonia recycle stream 42 to form total ammonia recycle stream 54. Stream 54 is compressed to urea synthesis pressure in compressor 55, and recycled via 56 to urea synthesis. Stream 56 is combined with fresh ammonia feed stream 57 to provide total ammonia feed stream 2.

Various alternatives within the scope of the present invention will occur to those skilled in the art. Thus, it should be understood that the specific ranges of process operating variable such as pressure and temperature which have been recited supra in the description of the processing sequence, should not be considered as limitations on the scope of the process of the present invention. Operation of the process outside of these specific ranges is of course feasible, however in most instances such operation would prove to be less efficient or economical.

In addition, it should be noted that the condenser-stripper gas purification and separation technique outlined supra represents merely a preferred mode of operation of the process of the present invention. Other recycle techniques, such as selective absorption of excess ammonia or carbon dioxide with a solvent solution such as urea nitrate, ammonium nitrate or monoethanolamine, followed by separate condensation and recycle of the residual gas phase, may also be employed.

Finally, the scope of the present invention is not limited to two-stage or multi-stage pressure reduction and off-gas generation. Thus, the process of the present invention is economically applicable to single-stage decompression of the synthesis effluent from urea synthesis pressure to a low final pressure. This low final pressure would preferably be in the 5 p.s.i.g. to 50 p.s.i.g. range, which is the optimum pressure range for discharge of the product urea solution to finishing operations as mentioned supra. This single-stage decompression alternative would be preferable in some cases, especially where equipment costs are high relative to operating power expenses. Thus, depending on relative costs, it could be less expensive to decompress in one stage, thus eliminating the second heat exchanger-decomposer, condenser stripper, gas-liquid separators, etc., while providing larger compressors or pumps for recycle of the total amount of the unconverted process components from the low pressure range to urea synthesis pressure.

Various other alternatives of this nature will occur to those skilled in the art.

An example of a typical application of the process of the process of the present invention will now be described.

*Example*

Streams of ammonia, carbon dioxide and recycle aqueous ammonium carbamate solution were passed to urea synthesis at 3500 p.s.i.g. and 365° F. Overall molar ammonia:carbon dioxide ratio was 4:1, and a 62% conversion to urea was obtained, based on carbon dioxide. The autoclave effluent was adiabatically flashed down to 270 p.s.i.g., and the resulting equilibrium off-gas was removed at 250° F. and contained only 7% water vapor on a molar basis. Carbon dioxide material balance indicated that 30% of the total ammonium carbamate in the autoclave effluent was decomposed and flashed off in this initial off-gas stream. The residual process stream was heated to 295° F. at 270 p.s.i.g. to further decompose ammonium carbamate. The off-gas thus generated was separated from the process stream. This off-gas stream contained 13 mol percent water vapor, and material balance showed that it also contained ammonia and carbon dioxide equivalent to 70% of the total ammonium carbamate. These two off-gas streams were combined at 270 p.s.i.g. and passed to the high pressure condenser-stripper. The combined gas stream thus contained a total of 80% of the original ammonium carbamate which was present in the autoclave effluent. In addition, and most important, this combined off-gas stream contained about 40% less water per unit moles of ammonia and carbon dioxide, compared to an equivalent off-gas obtained by simultaneous pressure reduction and heating in which a single off-gas is produced.

The pressure of the residual process stream was then further reduced from 270 p.s.i.g. to 20 p.s.i.g. under adiabatic conditions. Process stream temperature decreased from 295° F. to 185° F., and the spontaneously generated off-gas derived principally from further ammonium carbamate decomposition, was immediately separated from the process stream. This off-gas contained 12% water vapor and 50% of the total residual ammonium carbamate present in the process stream before pressure reduction. The residual process stream was again heated, from 185° F. to 215° F., and final decomposition of substantially all of the residual ammonium carbamate present in the process stream was accomplished. A final off-gas was separated, containing 25% water vapor and the balance of the ammonia and carbon dioxide derived from carbamate decomposition. This final off-gas was combined with the previously generated 20 p.s.i.g. off-gas, and the combined low pressure off-gas was passed to the low pressure condenser-stripper. This combined off-gas stream contained about 42% of the equivalent amount of water vapor which would have been present using conventional procedure. The residual process stream, consisting now of aqueous urea solution containing a small amount of dissolved ammonia and carbon dioxide, was passed to degassing and finishing operations.

The two streams of off-gas, derived from the main process at 270 p.s.i.g. and 20 p.s.i.g., were processed in condenser-strippers in a manner set forth in U.S. patent application 5,379, cited supra. Recycle streams of aqueous ammonium carbamate solution and ammonia free of carbon dioxide were returned to urea synthesis. The overall water balance on the recycle system was readily maintained at optimum concentration levels, and water buildup in the recycle stream of aqueous ammonium carbamate solution was completely prevented.

What I claim is:

1. In a urea synthesis process in which ammonia, carbon dioxide and recycled aqueous ammonium carbamate solution are reacted at elevated urea synthesis pressure to form urea, the resulting process stream containing urea, unconverted ammonium carbamate, excess ammonia and water is heated at reduced pressure to decompose ammonium carbamate, an off-gas containing water vapor, excess ammonia, and ammonia and carbon dioxide derived from said ammonium carbamate decomposition is separated from the residual process stream containing product urea, said off-gas is at least partially condensed to form an aqueous ammonium carbamate solution, and said aqueous solution is compressed and recycled to urea synthesis, the improvement which comprises reducing the pressure of the urea synthesis effluent process stream under substantially adiabatic conditions thereby decomposing ammonium carbamate, separating a first off-gas having low water vapor content from the residual process stream, heating the residual process stream to further decompose ammonium carbamate, separating a second off-gas of higher water vapor content, and combining said first and second off-gases to produce a combined off-gas stream from which aqueous ammonium carbamate solution is condensed and recycled, whereby said combined off-gas stream contains substantially less water vapor than an off-gas stream produced by simultaneous pressure reduction and heating to decompose ammonium carbamate, in which a single off-gas stream is removed from the process stream.

2. In a urea synthesis process in which ammonia, carbon dioxide and recycled aqueous ammonium carbamate solution are reacted at elevated urea synthesis pressure to form urea, the resulting urea synthesis effluent process stream containing product urea, unconverted ammonium carbamate, excess ammonia and water is heated at intermediate reduced pressure to decompose a portion of said unconverted ammonium carbamate, a first off-gas containing water vapor, excess ammonia, and ammonia and carbon dioxide derived from said ammonium carbamate decomposition is separated from the residual process stream, said residual process stream containing product urea, residual ammonium carbamate, residual excess ammonia and water is heated after further pressure reduction to decompose the balance of said ammonium carbamate, a second off-gas containing water vapor, excess ammonia, and ammonia and carbon dioxide derived from said decomposition of the balance of ammonium carbamate is separated from the final residual process stream consisting of product aqueous urea solution, said first and second off-gases are at least partially condensed to form aqueous ammonium carbamate solutions, and said aqueous solutions are compressed and recycled to urea synthesis, the improvement which comprises conducting said pressure reductions under substantially adiabatic conditions and thereby decomposing ammonium carbamate, whereby partial first and partial second off-gases are produced having low water vapor contents, separating said partial off-gas streams from the process stream, heating the process stream at each pressure level to further decompose ammonium carbamate and produce the balance of said first and second off-gases, combining said partial first off-gas with the balance of said first off-gas to form a combined first off-gas, combining said partial second off-gas with the balance of said second off-gas to form a combined second off-gas at lower pressure, at least partially condensing said combined first off-gas and said combined second off-gas to form aqueous ammonium carbamate solutions, and compressing and recycling said aqueous solutions to urea synthesis, whereby said combined first off-gas stream and said combined second off-gas stream, and the resulting aqueous ammonium carbamate solutions, contain substantially less water than corresponding process streams produced by simultaneous pressure reduction and heating of the process stream to decompose ammonium carbamate, in which a single off-gas stream is removed from the process stream at each pressure level.

3. In a urea synthesis process in which ammonia, carbon dioxide and recycled aqueous ammonium carbamate solution are reacted at highly elevated pressure to form urea, the resulting process stream containing product urea, unconverted ammonium carbamate, excess ammonia and water is heated at a reduced pressure in the range of 200 p.s.i.g. to 400 p.s.i.g. and a temperature in the range of 270° F. to 310° F. to decompose a portion of said unconverted ammonium carbamate, a first off-gas containing water vapor, excess ammonia, and ammonia and carbon dioxide derived from said ammonium carbamate decomposition is separated at said reduced pressure from the residual process stream, said residual process stream containing product urea, residual ammonium carbamate, residual excess ammonia and water is heated at a temperature in the range of 200° F. to 240° F. after further pressure reduction to the range of 5 p.s.i.g. to 50 p.s.i.g. whereby the balance of said ammonium carbamate is decomposed, a second off-gas containing water vapor, excess ammonia, and ammonia and carbon dioxide derived from said decomposition of the balance of ammonium carbamate is separated at 5 p.s.i.g. to 50 p.s.i.g. pressure from the final residual process stream consisting of product aqueous urea solution, said first and second off-gases are at least partially condensed to form aqueous ammonium carbamate solutions, and said aqueous solutions are compressed and recycled to urea synthesis, the improvement which comprises conducting said pressure reduction to a pressure in the range of 200 p.s.i.g. to 400 p.s.i.g. under substantially adiabatic conditions, whereby the process stream temperature decreases to below 270° F. and a partial first off-gas having low water vapor content is produced, separating said partial first off-gas from the process stream, heating the process stream to the range of 270° F. to 310° F. to decompose ammonium carbamate and produce additional first off-gas, combining said partial first off-gas with said additional first off-gas to form a combined first off-gas at said reduced pressure in the range of 200 p.s.i.g. to 400 p.s.i.g., conducting said further pressure reduction to a pressure in the range of 5 p.s.i.g. to 50 p.s.i.g. under substantially adiabatic conditions, whereby the process stream temperature decreases to below 200° F. and a partial second off-gas having low water vapor content is produced, separating said partial second off-gas from the process stream, heating the process stream to the range of 200° F. to 240° F. to decompose residual ammonium carbamate and produce additional second off-gas, separating said additional second off-gas from the residual process stream consisting of product aqueous urea solution, combining said partial second off-gas with said additional second off-gas to form a combined second off-gas at said further reduced pressure in the range of 5 p.s.i.g. to 50 p.s.i.g., whereby said combined first off-gas and said combined second off-gas, and the resultant aqueous ammonium carbamate solutions produced therefrom by partial condensation, contain substantially less water than corresponding process streams produced by simultaneous pressure reduction and heating of the process stream to decompose ammonium carbamate, in which a single off-gas stream is removed from the process stream at each pressure level.

4. Process of claim 3, in which said adiabatic pressure reduction to a pressure in the range of 200 p.s.i.g. to 400 p.s.i.g. results in a final process stream temperature in the range of 240° F. to 270° F., whereby sufficient concomitant decomposition of ammonium carbamate takes place to yield a partial first off-gas with about 5 to 7 mol percent water content, and said adiabatic further pressure reduction to a pressure in the range of 5 p.s.i.g. to 50 p.s.i.g. results in a final process stream temperature in the range of 155° F. to 200° F., whereby sufficient concomitant decomposition of ammonium carbamate takes place to yield a partial second off-gas with about 10 to 14 mol percent water content.

5. Urea synthesis process with total recycle of unconverted reactants which comprises reacting ammonia, carbon dioxide and recycle aqueous ammonium carbamate solution in an overall ammonia to carbon dioxide molar ratio in the range of 2.5:1 to 6:1 at a pressure between about 2000 p.s.i.g. to 6000 p.s.i.g. and a temperature between about 320° F. to 430° F. to form urea, adiabatically reducing the pressure of the resulting process stream to a level in the range of 200 p.s.i.g. to 400 p.s.i.g., separating a partial first off-gas at a temperature in the range of 240° F. to 270° F., heating the residual process stream to a higher temperature in the range of 270° F. to 310° F., separating additional first off-gas, combining said partial first off-gas and said additional first off-gas to form a combined first off-gas, adiabatically further reducing the pressure of the residual process stream to a level in the range of 5 p.s.i.g. to 50 p.s.i.g., separating a partial second off-gas at a temperature in the range of 155° F. to 200° F., heating the residual process stream to a higher temperature in the range of 200° F. to 240° F., separating additional second off-gas from the residual process stream consisting of product aqueous urea solution, combining said partial second off-gas and said additional second off-gas to form a combined second off-gas, separately scrubbing said first and said second off-gas streams with recycling streams of cold aqueous ammonium carbamate solution, whereby said off-gas streams are cooled and partially condensed, further cooling and refluxing said off-gas streams to produce residual off-gas streams comprising ammonia free of carbon dioxide, recycling said residual off-gas streams of ammonia to urea synthesis, cooling and recycling portions of said streams of ammonium carbamate solution to said gas scrubbing, and compressing and recycling the balance of said streams of ammonium carbamate solution to urea synthesis.

References Cited by the Examiner

UNITED STATES PATENTS

| | | | |
|---|---|---|---|
| 1,429,483 | 9/22 | Bosch | 260—555 |
| 1,898,093 | 2/33 | Miller | 260—555 |
| 2,848,493 | 8/58 | Dewling et al. | 260—555 |
| 2,913,493 | 11/59 | Sze et al. | 260—555 |

FOREIGN PATENTS 226,148 11/58 Australia.

OTHER REFERENCES

Tonn: Chem. Eng., vol. 62, No. 7 (1955), pages 186–90.

IRVING MARCUS, *Primary Examiner.*